United States Patent
Lundeen et al.

[11] Patent Number: 5,551,376
[45] Date of Patent: Sep. 3, 1996

[54] CLUMPING LITTER LINER-SIEVE SYSTEM

[76] Inventors: Marcee G. Lundeen; Daniel N. Lundeen, both of 1700 W. Loop South, Suite 1230, Houston, Tex. 77027; Milton Gaman, R.R.-1 Box 185X26, Galveston, Tex. 77554

[21] Appl. No.: 522,193

[22] Filed: Aug. 31, 1995

[51] Int. Cl.$^6$ ............................................. A01K 29/00
[52] U.S. Cl. ................................................ 119/167
[58] Field of Search ................................. 119/165, 166, 119/167, 168, 170

[56] References Cited

U.S. PATENT DOCUMENTS

| | | | |
|---|---|---|---|
| 2,015,119 | 9/1935 | McEwen | 150/1 |
| 2,654,527 | 9/1953 | Geckler et al. | 229/56 |
| 2,761,481 | 9/1956 | Boatwright | 150/1 |
| 3,394,870 | 7/1968 | Curtis | 229/56 |
| 3,809,013 | 5/1974 | Rigney et al. | 119/1 |
| 4,279,217 | 7/1981 | Behringer | 119/1 |
| 4,308,825 | 1/1982 | Stepanian | 119/1 |
| 4,312,295 | 1/1982 | Harrington | 719/1 |
| 4,615,300 | 10/1986 | McDonough | 119/1 |
| 4,723,510 | 2/1988 | Skillestad | 119/1 |
| 4,784,082 | 11/1988 | Wolfe | 119/1 |
| 4,870,924 | 10/1989 | Wolfe | 119/1 |
| 4,993,845 | 2/1991 | Faltynek | 383/40 |
| 5,031,578 | 7/1991 | Hammons et al. | 119/167 |
| 5,038,721 | 8/1991 | Ouelette et al. | 119/167 |
| 5,062,392 | 11/1991 | Lavash | 119/167 |
| 5,121,712 | 6/1992 | Schulein, Jr. et al. | 119/167 |
| 5,207,772 | 5/1993 | Lauretta et al. | 119/167 |

*Primary Examiner*—Gene Mancene
*Assistant Examiner*—Thomas Price
*Attorney, Agent, or Firm*—Sroufe, Payne & Lundeen, L.L.P.

[57] ABSTRACT

A liner-sieve system for use with a litter box which employs litter of the clumping type. The system includes a cassette having a plurality of flexible liner sheets stacked over the litter box with a netting secured to an upper surface of each liner sheet disposed in a central area of the box. A releasable flap is formed in each liner sheet beneath the netting. The liner sheets are fused together at peripheral edges which can be draped over the wall of the litter box, and the liner sheets are perforated adjacent the peripheral edges for separation of an uppermost liner sheet from the next lower liner sheet. Clumping litter disposed in the central area opens the flap to allow the unclumped litter to sift through the netting onto the next lower liner sheet. The clumped litter and feces is retained in the liner and netting material for convenient disposal. The flap generally inhibits litter from passing through the netting until the uppermost liner sheet is lifted from the next lower liner sheet.

20 Claims, 2 Drawing Sheets

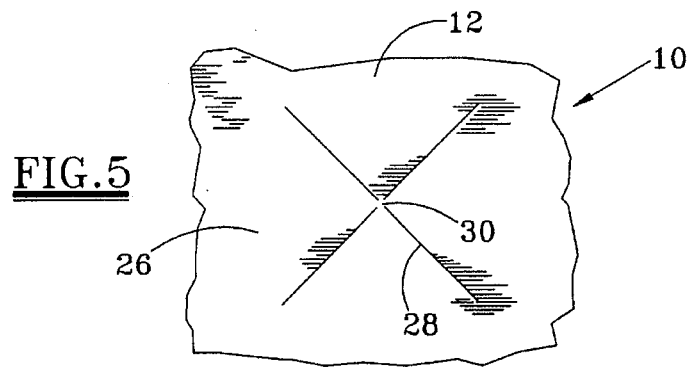
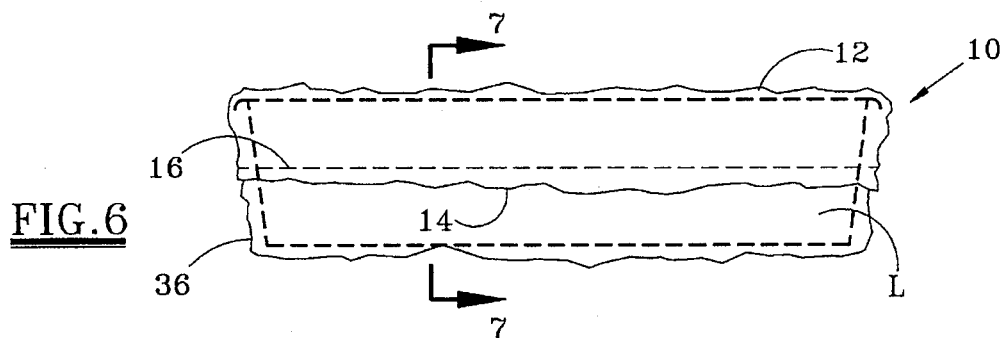
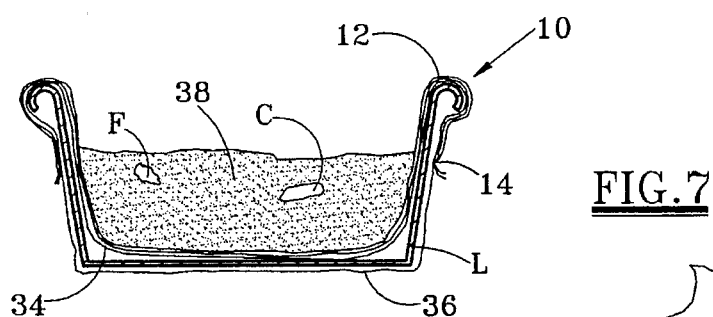
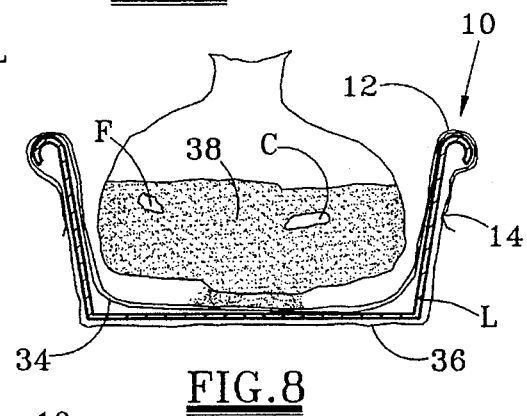
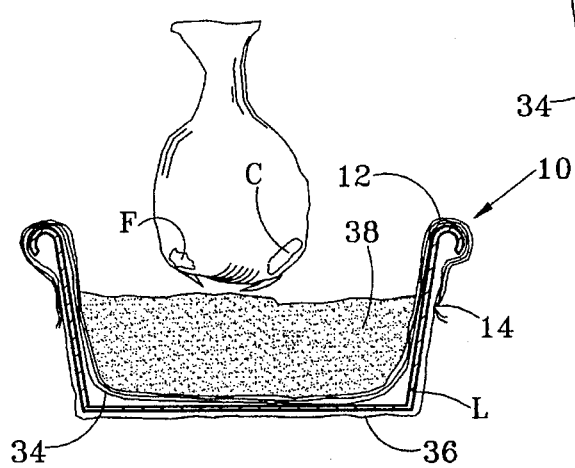

CLUMPING LITTER LINER-SIEVE SYSTEM

FIELD OF THE INVENTION

This invention relates to a method and system for removing waste material from an animal litter box which uses clumping litter.

BACKGROUND OF THE INVENTION

The use of a clumping type of litter in animal litter boxes, such as, for example, cat litter boxes, has desirable features. The clumping of the litter upon contact by liquid waste material such as urine allows the waste material to be easily separated from the uncontaminated litter. Commonly, the clumps of litter and the fecal material in the litter box after use by an animal are removed by scooping the litter with a slotted or perforated spoon to sift the unclumped litter from the waste material. In this manner, the uncontaminated litter can be, at least in theory, kept clean for continued use by the animal. Litter removed with the waste material is generally periodically replaced to maintain a sufficient quantity of litter in the box for use by the animal.

Sifting the litter with the scooping spoon is undesirable. The chore can be time-consuming and often not as effective as desired. For example, if the slots in the spoon are too large, smaller pieces of soiled litter and waste material cannot be separated. Or, if the sifting action is too vigorous, the clumps of litter can be disturbed and broken so that they are not removed from the litter.

Various attempts at devising a litter box liner to facilitate separating the soiled litter and solid waste material from the unsoiled litter have been attempted. Many of these were developed prior to the advent of clumping litter and are designed for use with non-clumping clay type litters, for example, to remove only fecal material. More recently, liners having holes formed therethrough in a spaced-apart manner have been proposed, as in U.S. Pat. No. 5,121,712. These liners still have a number of drawbacks. For example, the holes are usually sized and spaced in a manner which does not allow the unsoiled litter to flow freely from the sifting liner. The relatively large perforations through the liner can allow litter to move between the adjacent liners, and then when it is contacted with urine, to clump the liners together. Or, if no litter has moved between the liners, the urine can penetrate, increasing the difficulty of separating the liner layers, as well as making the task unpleasant because of the exposure to the urine on the exposed surface of the liner.

The prior art sifting liners are also difficult to handle and/or are too expensive for economical everyday use. Where the sifting liners are made of rigid or semirigid materials, as in U.S. Pat. No. 4,615,300, the cost is generally prohibitive. On the other hand, where the sifting liners are made of a thermoplastic film such as a polyethylene sheet, the liners are difficult to handle. For example, the liners are often held in place by a rubber band extending around the perimeter of the litter box holding the liners in place draped over the edges of the litter box. When it is desired to remove the liner, the top liner must be carefully removed from under the rubber band; however, this is often difficult because the thermoplastic sheets tend to stick together and thus become misaligned when it is attempted to remove just the topmost liner.

Other patents of interest which do not adequately address each of these problems include U.S. Pat. Nos. 5,062,392; 5,038,721; 5,031,578; 4,993,845; 4,870,924; 4,784,082; 4,723,510; 4,312,295; 4,308,825; 4,279,217; 3,809,013; 3,394,870; 2,761,481; and 2,015,119.

Accordingly, there remains a need in the art for a sifting liner system for use with clumping litter which is economical for everyday use, inhibits passage of urine and litter between liner layers, is easy to use and keep aligned, and allows separation of liners for sifting of soiled litter and waste material from unsoiled litter, and quickly and easily effects the sifting operation.

SUMMARY OF THE INVENTION

The present invention provides, in one aspect, an animal litter box system. The system includes a box having a central area and a peripheral wall. A plurality of liner sheets are stacked over the box and cover the central area. Each liner sheet has a netting secured to an upper surface opposite the central area, and a releasable flap formed in the liner sheet beneath the netting. The liner sheets are held together at peripheral edges draped over the peripheral wall. The liner sheets are perforated adjacent the peripheral edges for separation of an uppermost liner sheet from the next lower liner sheet. A quantity of clumping litter is disposed in the central area over the uppermost liner. The netting has grid openings for unclumped litter to sift therethrough and clumped litter to be retained thereon. The flap substantially inhibits litter from passing through the netting until the uppermost liner sheet is separated at the perforation and lifted from the next lower liner sheet.

The litter box system preferably includes a contiguous, unflapped bottom liner sheet attached to the flapped liner sheets adjacent the peripheral edges. A backing liner sheet can be adjoined to the bottom liner sheet adjacent the peripheral edges with an open length to form a bag for receiving the box between the bottom and backing liner sheets. The flaps preferably comprise a slit cut in the liner sheet and a releasable closure joining opposite edges of the slit, wherein the closure is releasable by the weight of the litter upon the lifting of the liner sheet. More preferably, the flap is formed by a pair of transverse intersecting slits, and the closure is formed at the intersection of the slits.

In another aspect, the present invention provides a litter box liner system for use with a litter box containing a quantity of clumping litter. The system includes a cassette of liner sheets of like length and width joined at peripheral edges. A section of netting is secured to an upper surface of each liner sheet and spaced from the peripheral edges in a central area of each liner. A releasable flap is formed in each liner sheet below the netting. The netting comprises a grid for sifting unclumped litter through the netting and the open flap onto a liner sheet next below, and retaining clumped litter and solid animal waste on the netting for disposal.

The liner sheets of the litter box liner system are preferably perforated adjacent the peripheral edges for sequential separation of an uppermost liner sheet from a cassette. The cassette preferably includes a contiguous unflapped bottom sheet, and can also include a contiguous, unflapped backing sheet below the bottom sheet. An open edge section is formed between the bottom and backing sheets for receiving the litter box between them. The flaps in the litter box liner system preferably include a slit cut in the liner sheet and a releasable closure joining opposite edges of the slit. More preferably, the flap is formed by a pair of transverse intersecting slits, and the releasable closure is formed at the intersection of the slits.

The liner sheets in the litter box liner system preferably comprise thermoplastic films, e.g. polyethylene, fused together at the peripheral edges. The netting is preferably a thermoplastic mesh fused along a perimeter thereof to an upper surface of a respective liner sheet.

As a further aspect, the present invention provides a method for removing waste from an animal litter box. The method includes the steps of: (a) placing the cassette of liners described above over a litter box with the netting facing up and disposed in a central area of the box; (b) placing a quantity of clumping litter on the cassette of liners in the central area of the box; (c) allowing an animal to deposit waste in the litter; (d) lifting an uppermost liner sheet by the edges to release the flap and sift unclumped litter through the netting onto the next lower liner sheet, and retain the waste on the netting; and (e) repeating steps (c) and (d) a plurality of times. The method can also include a step (f) of adding supplemental litter to the litter sifted onto the next uppermost layer in step (d). The liner sheets are preferably perforated adjacent the peripheral edges and step (d) includes tearing the uppermost liner sheet away from the cassette along the perforations. The cassette can also include a contiguous bottom sheet joined at peripheral edges with the liner sheets, and a contiguous adjoined backing sheet below the bottom sheet with an open edge, and wherein step (a) includes inserting the litter box through the open edge between the bottom and backing sheets. In a preferred embodiment of the method, the flaps comprise a slit cut in the liner sheet which is openable in step (d) by the weight of the litter. More preferably, the flaps are formed by a pair of transverse intersecting slits under the netting and the closure is adjacent the intersection and releasable in step (d) by the weight of the litter. The liner sheets used in the method preferably comprise thermoplastic films fused together at peripheral edges, and the netting preferably comprises a thermoplastic mesh fused along a perimeter thereof to an upper surface of a respective liner sheet.

BRIEF DESCRIPTION OF THE DRAWINGS

FIG. 5 is an enlarged respective view of the releasable flap in the liners in the cassette of FIG. 1.

FIG. 6 is a side elevation of a litter pan received between the bottom liner sheet and backing liner sheet of the cassette of FIG. 1.

FIG. 7 is a cross-sectional view of the litter pan and cassette of FIG. 6 as seen along the lines 7—7.

FIG. 8 is a side sectional view of the litter pan and liner cassette of FIG. 7 from which the uppermost liner has been separated in preparation for sifting unclumped litter from the clumped litter and fecal material.

FIG. 9 shows the apparatus of FIG. 8 wherein the unclumped litter is being sifted from the clumped litter and fecal material as the uppermost liner layer is lifted from the cassette.

DETAILED DESCRIPTION OF THE INVENTION

Figure 1:
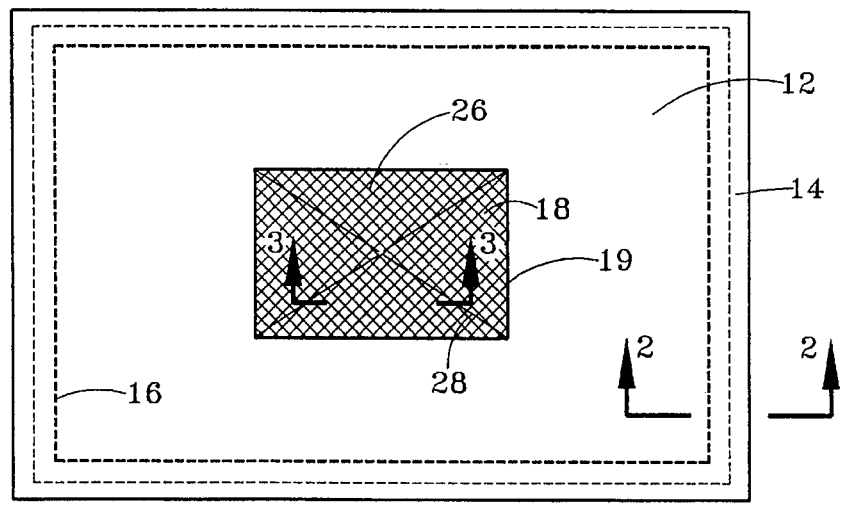
FIG. 1 is a plan view of a cassette of liners according to the present invention.

With reference to FIGS. 1–9 wherein like reference numerals indicate like parts, FIG. 1 shows a plan view of a cassette 10 of liners 12 according to the present invention. The liners comprise liquid-impervious films which are fused together, e.g. by heat, ultrasonic welding, an adhesive or the like, at peripheral edges 14. Polyolefin liners, e.g. polypropylene, high density polyethylene (HDPE), low density polyethylene (LDPE), or linear low density polyethylene (LLDPE) are suitable. LDPE of 0.4 or 0.5 mils is preferred.

The area of fusion is preferably continuous around the entire perimeter of the liners 12, but it would also be suitable to periodically fuse the liners together, e.g. along three edges, or at the corners with or without periodic fusion along each of the edges. It is necessary that the edges 14 be sufficiently fused to hold the liners 12 together in a package and keep them in place relative to each other in use.

A perforation 16 is formed in each liner adjacent the edge 14 to facilitate removal of a liner 12 from the cassette 10, for example, by tearing the liner 12 away from the cassette along the perforation 16.

Each liner 12 has a mesh or netting 18 secured to an upper surface thereof in a central area of the liner 12. The netting 18 is conveniently fused (e.g. thermally or ultrasonically) or glued along a perimeter 19 thereof to the upper surface of the liner 12. The netting 18 can be any netting having openings wide enough to allow the animal litter to sift therethrough while retaining clumped litter and fecal material thereon. Nylon netting or polypropylene weave are suitable for this purpose. In general, the filaments of the netting are relatively narrow compared to the size of the openings in order to avoid the retention of unclumped litter material between the openings. The use of a netting with relatively wide openings compared to the size of the filaments has been found to be essential in order to facilitate a relatively quick and efficient sifting operation.

Figure 4:
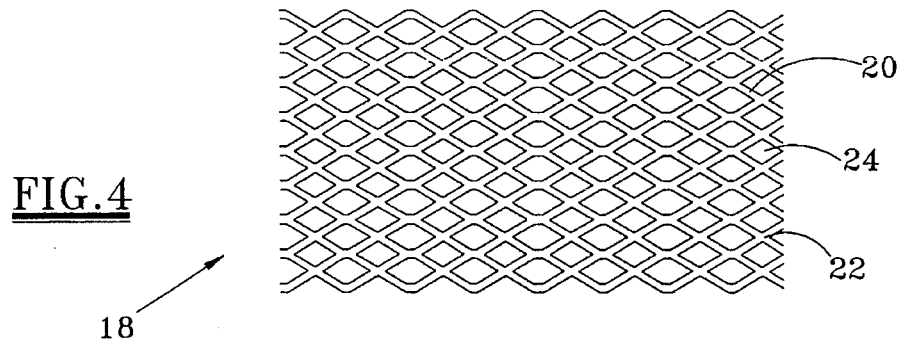
FIG. 4 is a representational view of a preferred netting material for use in constructing the liner cassette of FIG. 1.

A particularly preferred form of netting material is illustrated in FIG. 4 which is of the type used to form produce bags for the display of fruits and vegetables. This material is formed by extrusion of polyethylene filaments 20 which are fused in an alternating manner as at 22 to adjacent filaments to form the mesh material. Square (not shown) or diamond mesh with openings 24 from about 0.125 inch to 0.5 inch are suitable, but the preferred size of openings 24 depends on the type of litter to be used. For most commercially available feline litter of the clumping type, we prefer a diamond mesh with 3/16 inch openings 24.

A releasable flap 26 is formed in each liner 12 below the netting 18. The flap 26 generally remains closed in the cassette 10 to prevent the passage of litter and urine onto the next lower liner. When the topmost liner 12 is lifted from the cassette 10 as described in more detail below, the weight of the litter opens the flap 26 to allow the unclumped litter to sift through the netting 18. The flap 26 is conveniently formed from transverse slits 28 which are cut in the liner 12, for example, by a knife. The slits 28 are provided with a closure 30 at an intersection of the slits 28 comprising a discontinuity in each slit so that the corners of the flap 26 remain connected. The liner 12 is preferably made of a suitably ductile material such as polyethylene which can tear away at the corners of the flap 26 when the weight of the litter is supported thereon, as by lifting the liner 12 from the cassette 10 with litter on an upper surface thereof during sifting operations described in more detail below. Other flap arrangements which suitably restrict the passage of litter and urine between the cassette liners are also employed in the invention. The prevention of litter and urine passing between the layers is desirable in order to prevent adjacent liners 12 from being stuck or fused together by clumping of litter on nettings 18 of adjacent liners 12, and thus facilitates separation of the liners 12 during the sifting operation.

Figure 2:
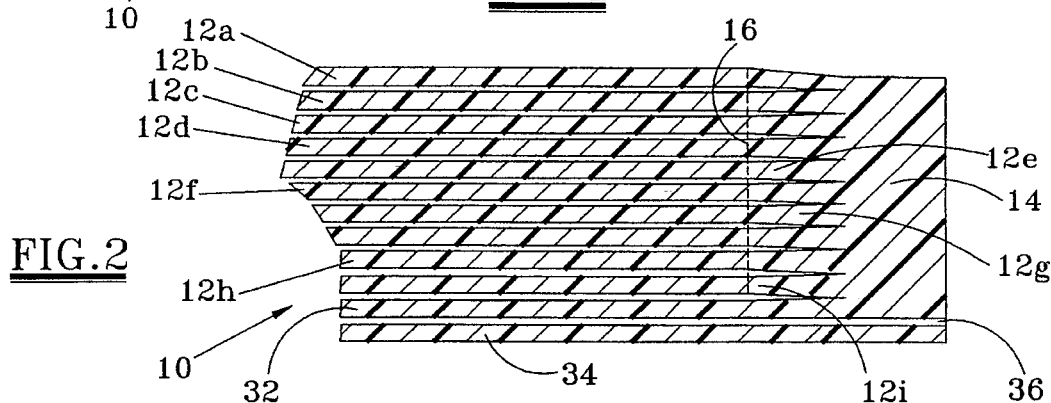
FIG. 2 is a cross-sectional view of the cassette of FIG. 1 as seen along the lines 2—2.
Figure 3:
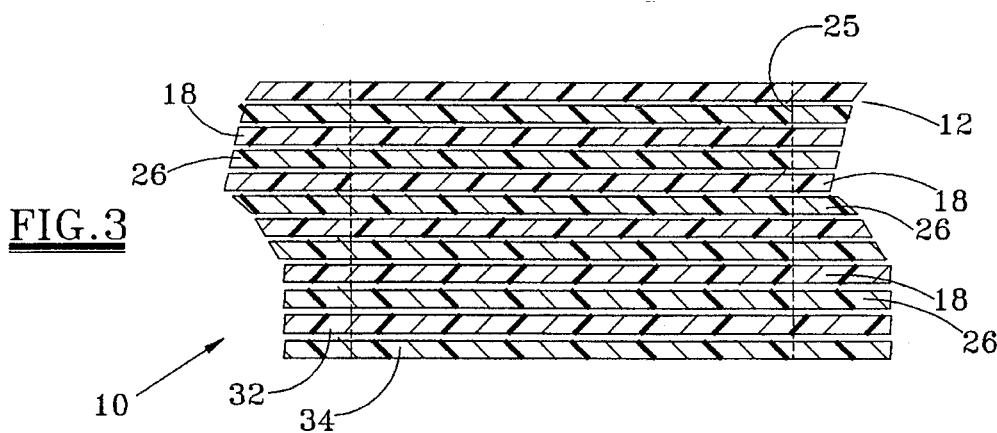
FIG. 3 is a cross-sectional view of the central area of the cassette of FIG. 1 as seen along the lines 3—3.

The cassette 10 can include a number of liners 12, e.g. 10 liners 12a–12h as seen in FIG. 2. The number of liners 12 depends on how many litter cleanings or siftings are desired from each cassette, i.e. generally one sifting or litter cleaning operation per liner 12. If desired, a bottom liner sheet 32 which is generally unflapped may be secured to the cassette 10 below the lowermost flapped liner 12i. The bottom liner 32 can be used as a litter transfer on which the litter sifted from the lowermost liner 12i is retained while a new cassette 10 is secured in place in the litter box L.

To secure the cassette 10 in place to litter box L, a backing liner sheet 34 may be attached to the bottom liner sheet 32 along the perimeter thereof, but leaving one open edge 36 so that the cassette 10 can be opened to receive the litter box L between the bottom sheet 32 and the backing sheet 34 through the open edge 36. With the litter box L positioned between the bottom sheet 32 and backing sheet 34, the cassette 10 is positioned so that the liners 12 line up with the litter box L to place the nettings 18 in a central region thereof. The backing sheet 34 facilitates holding the cassette 10 in place in relation to the litter box L. If desired, the open edge 36 can be taped closed, or a rubber band secured over the cassette 10 around the litter box L. Litter, preferably of the clumping type, is placed in the litter box L on top of the cassette 10 for use by the animal.

When the litter has become soiled by the deposition of the feces F and/or urine to form clumps C therein, the litter 38 can be sifted by removing the uppermost liner 12 as illustrated in FIGS. 7–9. Initially, the uppermost liner 12 is separated from the cassette 10 by tearing along the perforation 16. When the tearing is completed, the edges of the liner 12 are pulled together as illustrated in FIG. 8 to form a sack or bag. The uppermost liner 12 is then lifted from the cassette 10. The weight of the litter in the liner 12 forces the closure 30 to separate and open the flap 26 along the slits 28. The unclumped litter falls rapidly through the netting 18 onto the next uppermost liner as seen in FIG. 9. The feces F and urine clumps C are retained by the netting 18, and together with the liner 12 may be disposed of as a package.

When the bottommost flapped liner 12i is used to sift the litter, the litter remaining on the bottom sheet 32 may be held on the bottom sheet 32, e.g. by inverting the bag formed by the bottom sheet 32 and backing sheet 34, while the litter box L is removed through the open edge 36. After a new cassette 10 is in place on the litter box L, the litter transferred to the bottom sheet 32 is deposited on the uppermost liner 12a of the new cassette 10 for the continued use of clean litter by the animal.

The cassette 10 and liners 12 are illustrated as having a rectangular plan in FIG. 1. The dimensions of the cassette 10 depend on the size and geometry of the litter box L with which it is to be employed. Preferably, the upright walls of the litter box L are relatively high so that the perforation can be positioned adjacent an upper edge, or outside of an upper edge of the upright walls of the litter box L. This facilitates separation of the uppermost liner 12 at the perforation 16, and allows sufficient length on the edges of the liner 12 to facilitate gathering the uppermost liner into a sack or bag. Other liner shapes, e.g. circular or oval, could also be used, particularly when the litter box L is of a corresponding configuration.

Various changes and modifications in the invention will become apparent to those skilled in the art in view of the foregoing disclosure. All such modifications and variations within the scope and spirit of the appended claims are intended to be embraced thereby.

We claim:

1. An animal litter box system, comprising:
   a box having a central area and a peripheral wall;
   a plurality of flexible liner sheets stacked over the box and covering the central area, each liner sheet having a netting secured to an upper surface opposite the central area and a releasable flap formed in the liner sheet beneath the netting, wherein the liner sheets are held together at peripheral edges draped over the peripheral wall, and the liner sheets are perforated adjacent the peripheral edges for separation of an uppermost liner sheet from the next lower liner sheet;
   a quantity of clumping litter disposed in the central area over an uppermost liner, wherein the netting has grid openings for unclumped litter to sift therethrough and clumped litter to be retained thereon, and wherein the flap substantially inhibits litter from passing through the netting until the uppermost liner sheet is lifted up from the next lower liner sheet.

2. The litter box system of claim 1, further comprising a contiguous, unflapped bottom liner sheet joined to the flapped liner sheets adjacent the peripheral edges.

3. The litter box system of claim 1, further comprising a backing liner sheet joined to the bottom liner sheet adjacent the peripheral edges with an open length to form a bag for receiving the box between the bottom and backing liner sheets.

4. The litter box system of claim 1, wherein the flaps comprise a slit cut in the liner sheet and a releasable closure joining opposite edges of the slit, wherein the closure is releasable by weight of the litter upon the lifting of the liner sheet.

5. The litter box system of claim 4, wherein the flaps are formed by a pair of transverse intersecting slits, and the closure is formed at the intersection of the slits.

6. A litter box liner system for use with a litter box containing a quantity of clumping litter, comprising:
   a cassette of flexible liner sheets of like length and width joined at peripheral edges;
   a section of netting secured to an upper surface of each liner sheet spaced from the peripheral edges in a central area of each liner;
   a releasable flap formed in each liner sheet below the netting;
   wherein the netting comprises a grid for sifting unclumped litter through the netting and the open flap onto a liner sheet next below, and retaining clumped litter and solid animal waste on the netting.

7. The litter box liner system of claim 6, wherein the liner sheets are peripheral adjacent the peripheral edges for sequential separation of an uppermost liner sheet from the cassette.

8. The litter box liner system of claim 7, wherein the cassette includes a contiguous, unflapped bottom sheet.

9. The litter box liner system of claim 8, wherein the cassette includes a contiguous, unflapped backing sheet below the bottom sheet with an open edge section for receiving the litter box between the bottom and backing sheets.

10. The litter box liner system of claim 6, wherein the flaps comprise a slit cut in the liner sheet and a releasable closure joining opposite edges of the slit.

11. The litter box liner system of claim 10, wherein the flap is formed by a pair of transverse intersecting slits, and the releasable closure is formed at the intersection of the slits.

12. The litter box liner system of claim 7, wherein the liner sheets comprise thermoplastic films fused together at the peripheral edges.

13. The litter box liner system of claim 12, wherein the netting is a thermoplastic mesh fused along a perimeter thereof to a respective liner sheet.

14. A method for removing waste from an animal litter box, comprising the steps of:

(a) placing the cassette of liners of claim 6 over a litter box with the netting facing up and disposed in a central area of the box;

(b) placing a quantity of clumping litter on the cassette of liners in the central area of the box;

(c) allowing an animal to deposit waste in the litter;

(d) lifting an uppermost liner sheet by the edges to release the flap and sift unclumped litter through the netting onto the next lower liner sheet; and (e) repeating steps (c) and (d) a plurality of times.

15. The method of claim 14, comprising the step of (f) adding supplemental litter to the litter sifted onto the next uppermost layer in step (d).

16. The method of claim 14, wherein the liner sheets are perforated adjacent the peripheral edges and step (d) includes tearing the uppermost liner away from the cassette along the perforations.

17. The method of claim 16, wherein the flaps are formed by a pair of transverse intersecting slits under the netting and a closure adjacent the intersection releasable in step (d) by the weight of the litter.

18. The method of claim 16, wherein the liner sheets comprise thermoplastic films fused together at the peripheral edges, and the netting is a thermoplastic mesh fused along a perimeter thereof to a respective liner sheet.

19. The method of claim 14, wherein the cassette includes a contiguous bottom sheet joined at peripheral edges with the liner sheets, and a contiguous adjoined backing sheet below the bottom sheet with an open edge, and wherein step (a) includes inserting the litter box through the open edge between the bottom and backing sheets.

20. The method of claim 14, wherein the flaps comprise a slit cut in the liner which is openable in step (d) by the weight of the litter.

* * * * *